(No Model.)
F. O. BLACKWELL.
AUTOMATIC LUBRICATOR.
No. 435,085. Patented Aug. 26, 1890.
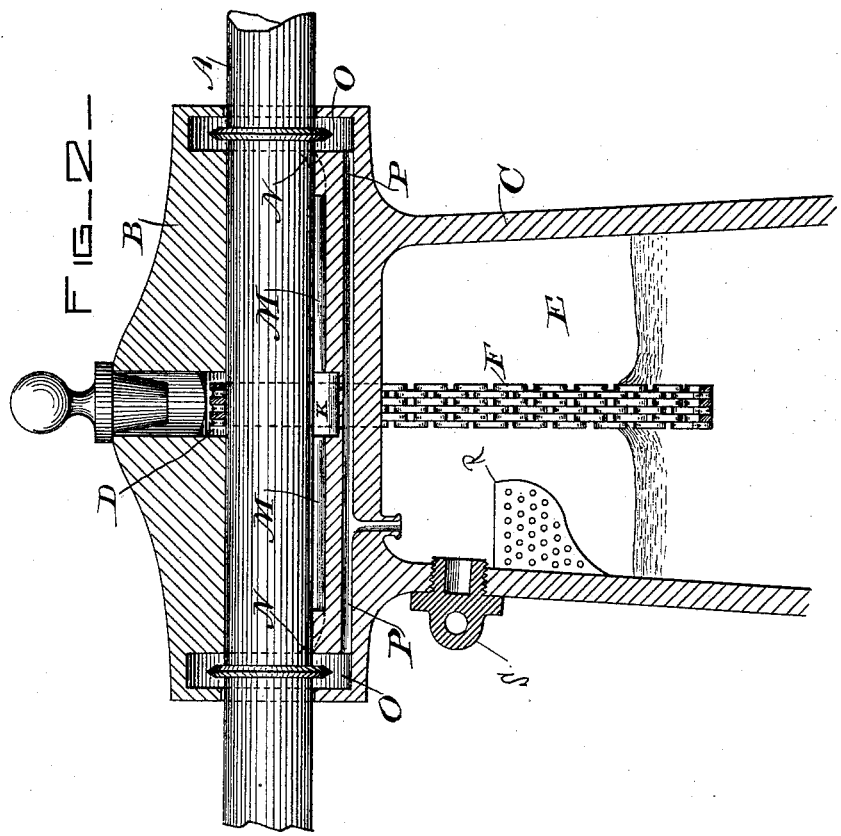
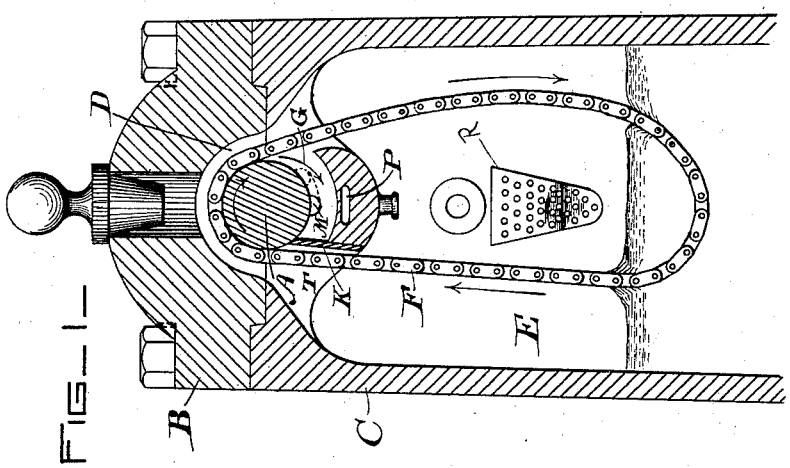
WITNESSES:
INVENTOR:
Francis O. Blackwell
by Butley & Knight
ATTYS.

UNITED STATES PATENT OFFICE.

FRANCIS O. BLACKWELL, OF BOSTON, MASSACHUSETTS.

AUTOMATIC LUBRICATOR.

SPECIFICATION forming part of Letters Patent No. 435,085, dated August 26, 1890.

Application filed March 28, 1890. Serial No. 345,656. (No model.)

*To all whom it may concern:*

Be it known that I, FRANCIS O. BLACKWELL, a citizen of the United States, residing at Boston, Massachusetts, have invented certain new and useful Improvements in Automatic Lubricators, of which the following is a specification.

My invention relates to automatic lubricators, and is illustrated in the accompanying drawings, in which—

Figure 1 is a transverse, and Fig. 2 a longitudinal, section of a bearing provided with my device.

In the drawings, A is a shaft inclosed in bearings divided horizontally, and having the upper and lower halves B and C. The lower part of the bearing is hollowed out to form an oil-reservoir E, directly under the bearing. In the center of the bearing is a groove D, concentric with the shaft, and provided on either side with a vertical passage T, opening into the reservoir below. The shaft at this point, by reason of the groove, is suspended free from contact with either the upper or lower halves of the bearing, and a chain F is hung upon the shaft in the opening formed by groove D, and extends down into the oil-reservoir, as is seen in Fig. 1. This chain is preferably of brass or copper, so as to resist corrosion, and is preferably made up of flat links riveted together. It will be apparent that as the shaft rotates the chain will be carried with it, and, running at a rapid rate, will draw up the oil in the direction of its movement; but when the oil reaches the shaft some means must be provided for spreading the oil along the shaft transversely from the chain. These means are as follows: The oil adhering to the chain will be drawn up onto the shaft, following the direction of the arrows in Fig. 1, to the point where the chain falls away from the shaft at the extremity of the horizontal diameter. The oil will then tend to follow the rotation of the shaft, and will be forced into the passage-way formed in the bearing beneath the shaft in the direction indicated by the arrow G, where it comes in contact with a dam K. formed of leather or metal, where, having no outlet, it will be forced to pass along longitudinal groove M in the lower part of the bearing along its entire length. As shown in Fig. 2, the groove M at the end of the bearing is divided and curved upward on either side, as at N, and then passes into the opening O in the end of the bearing, whence the oil falls back again into the reservoir. The oil passes from O by means of a duct P, which leads it so that it will fall into a filter R, and from thence it will drain into well or reservoir E. A plug S gives access to the filter. A large opening P is made in the cap of the bearing and closed by a pin R, which may be removed for inspection.

In practice this device has been proved remarkably effective, involving but little cutting into the bearing, working without any attention, and effecting a great saving in the consumption of oil.

What I claim as new, and desire to secure by Letters Patent, is—

1. The combination, with a bearing for a journal or shaft, of a lubricating-chain and oil-reservoir, the bearing being provided with an opening for the chain, and a passage-way beneath it for the oil, the said passage-way having a dam for forcing the oil longitudinally along the bearing.

2. The combination, with a shaft or journal, of a bearing therefor having a concentric passage in which is a chain passing over the shaft and extending into an oil-reservoir, the said bearing having also a longitudinal groove opening into the said passage, and means for diverting the oil raised by the chain into said groove and forcing it therethrough.

3. The combination, with a shaft or journal, of a bearing having a longitudinal groove beneath the shaft passing upward at its outer end, and a lubricating-chain passing over the shaft into a reservoir of oil, the bearing having a passage-way beneath the shaft adjacent to the chain and connecting with said groove, whereby the chain may force the oil along said groove.

4. The combination, with a shaft or journal, of a bearing therefor having a longitudinal groove M, a transverse passage-way connecting therewith closed at one end by a dam, and a lubricating-chain passing over the shaft at a point adjacent to the said passage-way, from which chain the oil may be driven into the passage-way and along the groove.

5. The combination, with shaft A, of a bearing therefor, a lubricating-chain F, passing over the shaft and extending through openings in the bearing into the oil-reservoir, a dam K, closing one extremity of a passageway under the shaft, which connects with a groove M, extending longitudinally in the bearing beneath the shaft, and having an external opening connecting with the oil-reservoir.

6. The combination, with shaft A, of a bearing having a concentric groove or opening and provided with passages into an oil-reservoir beneath, a chain F, passing over the shaft in the said concentric groove, and a dam K for closing the groove and forcing the oil longitudinally along the bearing.

FRANCIS O. BLACKWELL.

Witnesses:
E. M. BENTLEY,
A. O. ORNE.